United States Patent [19]

Pfeffer

[11] Patent Number: 5,648,158
[45] Date of Patent: Jul. 15, 1997

[54] METHOD OF PROTECTING METAL AGAINST CORROSION AND A VEHICLE INCLUDING A STRUCTURAL MEMBER PROTECTED BY THE METHOD IN HIGH TEMPERATURE AREAS

[75] Inventor: John D. Pfeffer, Brookfield, Wis.

[73] Assignee: A.O. Smith Corporation, Milwaukee, Wis.

[21] Appl. No.: 448,959

[22] Filed: May 24, 1995

[51] Int. Cl.⁶ .................................................. B32B 5/16
[52] U.S. Cl. .................. 428/325; 106/14.39; 106/14.44; 428/328; 428/329; 428/331; 428/467; 428/484; 428/908.8
[58] Field of Search ........................ 428/323, 325, 428/328, 331, 329, 450, 467, 484, 908.8; 106/14.05, 14.22, 14.25, 14.39, 14.44, 481

[56] References Cited

U.S. PATENT DOCUMENTS

| | | | |
|---|---|---|---|
| 3,754,942 | 8/1973 | Moradian | 106/14 |
| 3,844,729 | 10/1974 | Sedlatschek et al. | 29/195 |
| 3,926,656 | 12/1975 | Mangels | 106/272 |
| 3,990,860 | 11/1976 | Fletcher et al. | 29/182.5 |
| 4,564,555 | 1/1986 | Hornberger | 428/312.8 |
| 5,061,528 | 10/1991 | Ruehl | 427/430 |

*Primary Examiner*—H. Thi Le
*Attorney, Agent, or Firm*—David R. Price; James Earl Lowe, Jr.

[57] ABSTRACT

A vehicle including a structural member treated with a coating, the coating having imbedded therein refractory materials in areas where the structural member is subjected to high temperatures greater than 180 degrees Fahrenheit, the refractory materials being greater than 400 wire mesh in size and comprising 65 to 90 percent of the combined coating and refractory materials by weight.

17 Claims, 1 Drawing Sheet

METHOD OF PROTECTING METAL AGAINST CORROSION AND A VEHICLE INCLUDING A STRUCTURAL MEMBER PROTECTED BY THE METHOD IN HIGH TEMPERATURE AREAS

BACKGROUND OF THE INVENTION

This invention is directed to heat resistant and erosion, corrosion and abrasion resistant coatings and coated articles, and, more particularly, wax coating of high temperature areas of steel structural members for vehicles.

One common approach to the corrosion protection of steel structural members for vehicles has been to use a wax like material. One known method of applying the wax to the structural member is described in Ruehl U.S. Pat. No. 5,061,528 which is incorporated herein by reference.

A problem with the use of such wax like materials has been when the waxed area is subject to high temperatures, such as where exhaust from a vehicle exhaust pipe impinges on the treated member. When subjected to such high temperatures, the wax can melt and drip off the member and leave it exposed to corrosive and abrasive forces.

SUMMARY OF THE INVENTION

This invention provides a vehicle including a structural member treated with a coating, the coating having imbedded therein refractory materials in areas where the structural member is subjected to high temperatures greater than 180 degrees Fahrenheit. The refractory materials are greater than 400 wire mesh in size and comprise 65 to 90 percent of the combined coating and refractory materials by weight.

In one embodiment, the coating is hot wax and the refractory material is aluminum oxide powder. Alternatively or additionally, the refractory material can include glass micro spheres and/or sand. The refractory materials are preferably applied to the hot wax coated structural member while the wax is still warm by the use of either pressure blasting or a flame spray powder gun. Less application pressure is required if the refractory materials are applied while the wax is still warm. The refractory materials are preferably evenly dispersed throughout the wax coating.

The invention also provides a vehicle including a structural member treated with a hot wax, the hot wax having imbedded therein refractory materials so that the member has a coating of wax and refractory materials in areas where the structural member is subjected to high temperatures greater than 180 degrees Fahrenheit.

The invention also provides a method of protecting metal against corrosion, the method comprising the steps of coating the metal with a corrosion protective layer, then applying at high velocities refractory materials to the protective layer so that the metal has a coating of the corrosion protective layer and refractory materials imbedded in the protective layer, the refractory materials being greater than 400 wire mesh in size and comprising 65 to 90 percent of the combined protective layer and refractory materials by weight.

In one embodiment, the corrosion protective layer is hot wax, and the refractory materials are applied to the hot wax while the wax is still warm. The refractory materials are preferably applied by the use of either pressure blasting or a flame spray powder gun so that the refractory materials are evenly dispersed throughout the protective layer and are in relatively close contact with each other and with the metal surface. The refractory materials can be one or more of aluminum oxide powder, glass micro spheres and sand.

A principal advantage of the invention is the providing of a way to use a proven corrosion coating in high temperature areas where the coating alone would not provide adequate protection. The invention allows a vehicle frame or structural member to have a coating (the combined refractory materials and wax) that is too viscous to be applied by dipping or painting, as is conventional with wax alone. Therefore, according to the invention, the wax or corrosion protective layer can be applied by dipping or painting, and the refractory materials are then applied as described above.

Other features and advantages of the invention will become apparent to those skilled in the art upon review of the following detailed description, claims and drawings.

Figure 1:
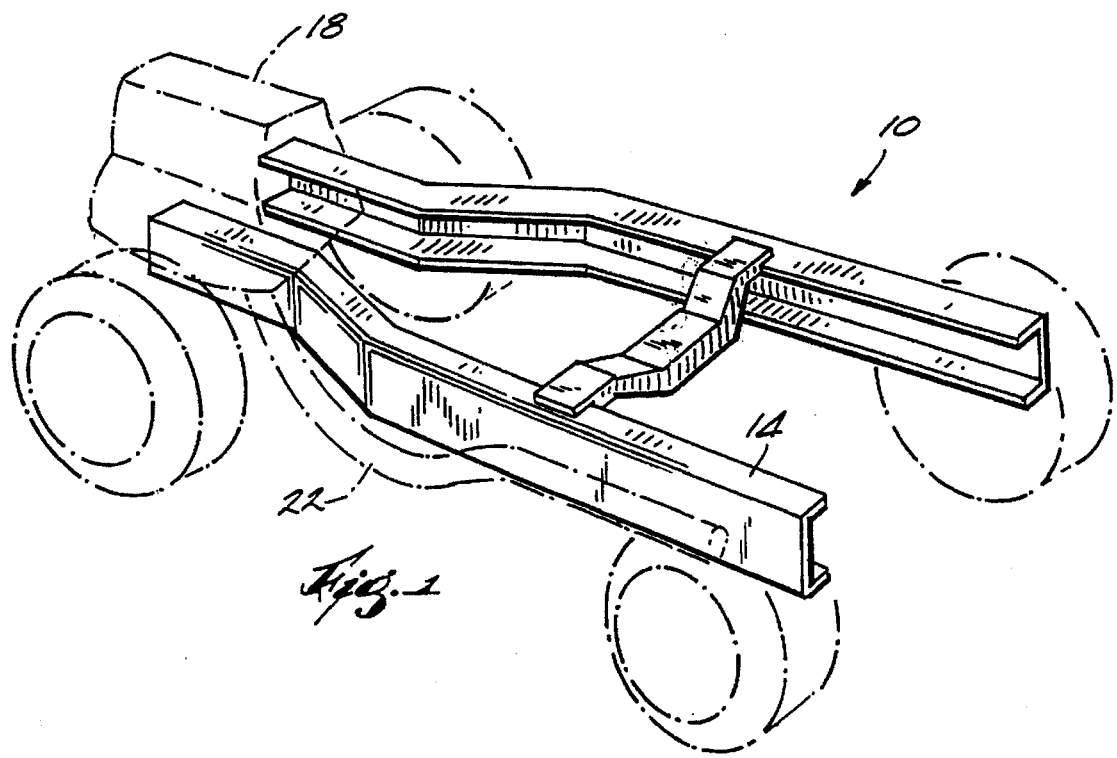
FIG. 1 is a simplified view of a vehicle including a structural member and an engine and an exhaust system exhausting heated gases near the structural member.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENTS

In prior art constructions, hot wax, such as that described in Ruehl U.S. Pat. No. 5,061,528, has been shown to provide good protection of vehicle structural members. FIG. 1 is a simple view of a vehicle 10 including such a structural frame member 14 and an engine 18 and an exhaust system 22 exhausting heated gases near the structural member 14. With the prior art construction, the heated exhaust gases caused the hot wax in the vicinity of the exhaust gases to drip off of the metal structural member, exposing the member to corrosive and abrasive forces.

In accordance with the invention, the structural member 14 is treated with a corrosion protective layer or coating 26, the coating having imbedded therein refractory materials or solids 30 in areas where the structural member is subjected to high temperatures greater than 180 degrees Fahrenheit. The refractory materials 30 are greater than 400 wire mesh in size and comprise 65 to 90 percent of the combined coating and refractory materials by weight. In other words, the weight of the refractory materials is between 65 and 90 percent of the weight of the refractory materials and the corrosion protective layer combined. In the preferred embodiment, the coating is a hot wax and the refractory materials are aluminum oxide powder. The refractory materials can alternatively include, without limitation, glass micro spheres or sand or any combination of the three mentioned materials. If a combination of powder and spheres is used, the ratio by weight of powder to spheres is preferably 40/60.

Figure 2:
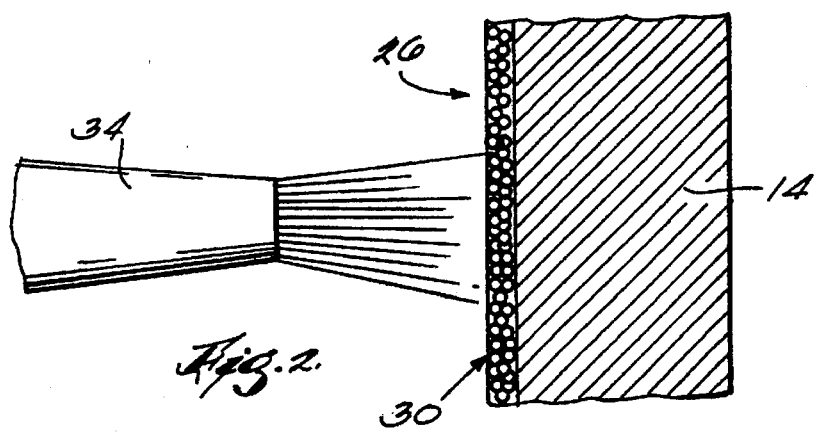
FIG. 2 is a simplified illustration of the application of the invention to a metal.

In the preferred embodiment, the refractory materials 30 are applied to the hot wax coated structural member by the use of a gun 34 (FIG. 2), which can be either a flame spray powder gun or a high pressure spray nozzle used for pressure blasting. The refractory materials are preferably applied to the hot wax coated structural member while the wax is still warm so that less application pressure is required. The refractory materials are preferably evenly dispersed throughout the wax coating and are in relatively close contact with each other and with the metal surface.

The hot wax has an adhesive property, the amount of adhesion being inversely proportional to the distance the wax is from a solid surface and also to the temperature of the wax. In the prior art construction, the hot wax covered the metal surface typically at thicknesses between 3 and 5 mils. Thus, the hot wax distance from the solid was great away from the metal surface. As the hot wax was heated, gravity easily exceeded the wax's adhesion to the metal surface, thereby causing the wax to flow. In this invention, the refractory materials are in relatively close contact with each other and with the metal's surface. This reduces the distance between the hot wax and a solid, thereby reducing the distance over which the hot wax extends from the solid. Accordingly, adhesive properties continue to be greater than gravity forces, so the wax remains in place and continues to protect the metal surface.

A steel panel ⅛ inch thick was coated with 3 to 5 mils of hot wax and was shot with a flame spray gun positioned about 8 inches from the hot wax with a mixture of aluminum oxide powder and hollow glass micro spheres. When subjected to radiant heating, the panel did not drip hot wax even at panel metal temperatures greater than 300 degrees Fahrenheit for one hour.

Other features and advantages of the invention are set forth in the following claims.

I claim:

1. A vehicle including a structural member treated with a wax coating, the wax coating having imbedded therein refractory materials in areas where the structural member is subjected to high temperatures greater than 180 degrees Fahrenheit, the refractory materials being greater than 400 wire mesh in size and comprising 65 to 90 percent of the combined wax coating and refractory materials by weight.

2. A vehicle in accordance with claim 1 wherein the refractory materials include at least one of aluminum oxide powder, glass micro spheres and sand.

3. A vehicle in accordance with claim 1 wherein the refractory materials are applied to the wax coated structural member by the use of either pressure blasting or a flame spray powder gun.

4. A vehicle in accordance with claim 1 wherein the vehicle also includes a frame supporting an engine, the frame including the structural member, and the vehicle also including an exhaust pipe having an outlet, and wherein the coating is adjacent the outlet.

5. A vehicle in accordance with claim 1 wherein the refractory materials are evenly dispersed throughout the coating.

6. A vehicle including a structural member treated with a wax, the wax having imbedded therein refractory materials so that the member has a coating of wax and refractory materials in areas where the structural member is subjected to high temperatures greater than 180 degrees Fahrenheit, the refractory materials comprising 65 to 90 percent or the combined wax and refractory materials by weight.

7. A vehicle in accordance with claim 6 wherein the refractory materials include at least one of aluminum oxide powder, glass micro spheres and sand.

8. A vehicle in accordance with claim 6 wherein the refractory materials are applied to the wax coated structural member by the use of either pressure blasting or a flame spray powder gun.

9. A vehicle in accordance with claim 6 wherein the refractory materials are greater than 400 wire mesh in size and comprise 65 to 90 percent of the combined wax and refractory materials by weight.

10. A vehicle in accordance with claim 6 wherein the vehicle also includes a frame supporting an engine, the frame including the structural member, and the vehicle also including an exhaust pipe having an outlet, and wherein the coating is adjacent the outlet.

11. A vehicle in accordance with claim 10 wherein the refractory materials include at least one of aluminum oxide powder, glass micro spheres, and sand, wherein the refractory materials are applied to the wax coated structural member by the use of either pressure blasting or a flame spray powder gun, and wherein the refractory materials are greater than 400 wire mesh in size.

12. A vehicle in accordance with claim 6 wherein the refractory materials are evenly dispersed throughout the wax.

13. A method of protecting metal against corrosion, the method comprising the steps of coating the metal with a corrosion protective wax layer, then applying at velocities refractory materials to the protective wax layer so that the metal has a coating of the corrosion protective wax layer and refractory materials imbedded in the protective wax layer, the refractory materials being greater than 400 wire mesh in size and comprising 65 to 90 percent of the combined protective wax layer and refractory materials by weight.

14. A method as set forth in claim 13 wherein the refractory materials are applied to the wax while the wax is warm.

15. A method in accordance with claim 13 wherein the refractory materials are evenly dispersed throughout the protective layer.

16. A method in accordance with claim 13 wherein said applying step includes applying said materials by the use of either pressure blasting or a flame spray powder gun.

17. A method in accordance with claim 13 wherein the refractory materials include at least one of aluminum oxide powder, glass micro spheres and sand.

* * * * *